(12) United States Patent
Wade

(10) Patent No.: US 7,246,572 B1
(45) Date of Patent: Jul. 24, 2007

(54) LIVESTOCK MANAGEMENT SYSTEM

(76) Inventor: Bruce E. Wade, 3962 Green Rd., Farmington, MO (US) 63640

( * ) Notice: Subject to any disclaimer, the term of this patent is extended or adjusted under 35 U.S.C. 154(b) by 181 days.

(21) Appl. No.: 11/066,632

(22) Filed: Feb. 25, 2005

(51) Int. Cl.
*A01K 1/00* (2006.01)

(52) U.S. Cl. ................ 119/516; 119/519; 119/455; 119/521; 119/502; 119/416

(58) Field of Classification Search .......... D30/108, D30/114, 113; 119/516–524, 14.03, 416, 119/455, 436, 456, 423–425, 452–454, 412, 119/400, 472, 475, 482, 502; 256/65.05
See application file for complete search history.

(56) References Cited

U.S. PATENT DOCUMENTS

| | | | | |
|---|---|---|---|---|
| 1,209,688 | A | | 12/1916 | Drew .................... 119/522 |
| 1,928,819 | A | * | 10/1933 | Neller ................... 119/524 |
| 2,023,774 | A | | 12/1935 | Sterling ................. 119/522 |
| 2,136,228 | A | * | 11/1938 | Babson et al. .......... 119/14.13 |
| 2,652,025 | A | * | 9/1953 | Beatty ................... 119/519 |
| 2,659,344 | A | | 11/1953 | Herbert ................. 119/28.5 |
| 2,814,271 | A | * | 11/1957 | Black .................... 119/55 |
| 3,051,127 | A | * | 8/1962 | Norbury ................ 119/734 |
| 3,370,570 | A | * | 2/1968 | Treangen ............... 119/517 |
| 3,415,227 | A | * | 12/1968 | Welsh ................... 119/524 |
| 3,726,256 | A | * | 4/1973 | Bernhardt et al. ....... 119/512 |
| 4,171,684 | A | | 10/1979 | Herr et al. ............. 119/521 |
| 4,201,158 | A | | 5/1980 | Parker ................... 119/751 |
| 4,432,305 | A | * | 2/1984 | Vernese ................. 119/752 |
| 4,470,372 | A | | 9/1984 | Norman ................. 119/524 |
| 4,503,809 | A | * | 3/1985 | Watkins, Sr. ........... 119/521 |
| 4,919,080 | A | * | 4/1990 | Balsbaugh .............. 119/524 |
| 4,977,856 | A | | 12/1990 | Norwood .............. 119/14.03 |
| 5,289,798 | A | | 3/1994 | Lock ..................... 119/58 |
| 5,309,869 | A | | 5/1994 | Albers, Jr. .............. 119/735 |
| 5,392,731 | A | | 2/1995 | Hoppman et al. ...... 119/14.03 |
| 5,469,808 | A | * | 11/1995 | Street et al. ........... 119/520 |
| 5,634,438 | A | | 6/1997 | Wilson .................. 119/752 |
| 5,651,333 | A | * | 7/1997 | Fisher ................... 119/734 |
| 6,026,766 | A | | 2/2000 | Albers, Jr. .............. 119/520 |
| 6,070,555 | A | | 6/2000 | Stubbs .................. 119/712 |
| 6,205,951 | B1 | | 3/2001 | Sprik .................... 119/60 |

FOREIGN PATENT DOCUMENTS

FR 2571218 * 4/1986

* cited by examiner

*Primary Examiner*—Andrea M. Valenti
(74) *Attorney, Agent, or Firm*—Grace J. Fishel

(57) ABSTRACT

A confinement and feeding stall for livestock such as horses, cows and the like with side frames spaced so that an animal can stand comfortably but not turn around and narrow enough to prevent other animals from crowding into an occupied stall. A gate is provided at one end of the side panels and a rear closure member may be provided at the other end. The side panels and gate prevent the animal from reaching over or around the side frames to disturb adjoining animals in adjacent stalls. The side frames are connected by elevated top members and flat bottom members to form individual stalls and stalls linked in side-by-side relationship.

10 Claims, 5 Drawing Sheets

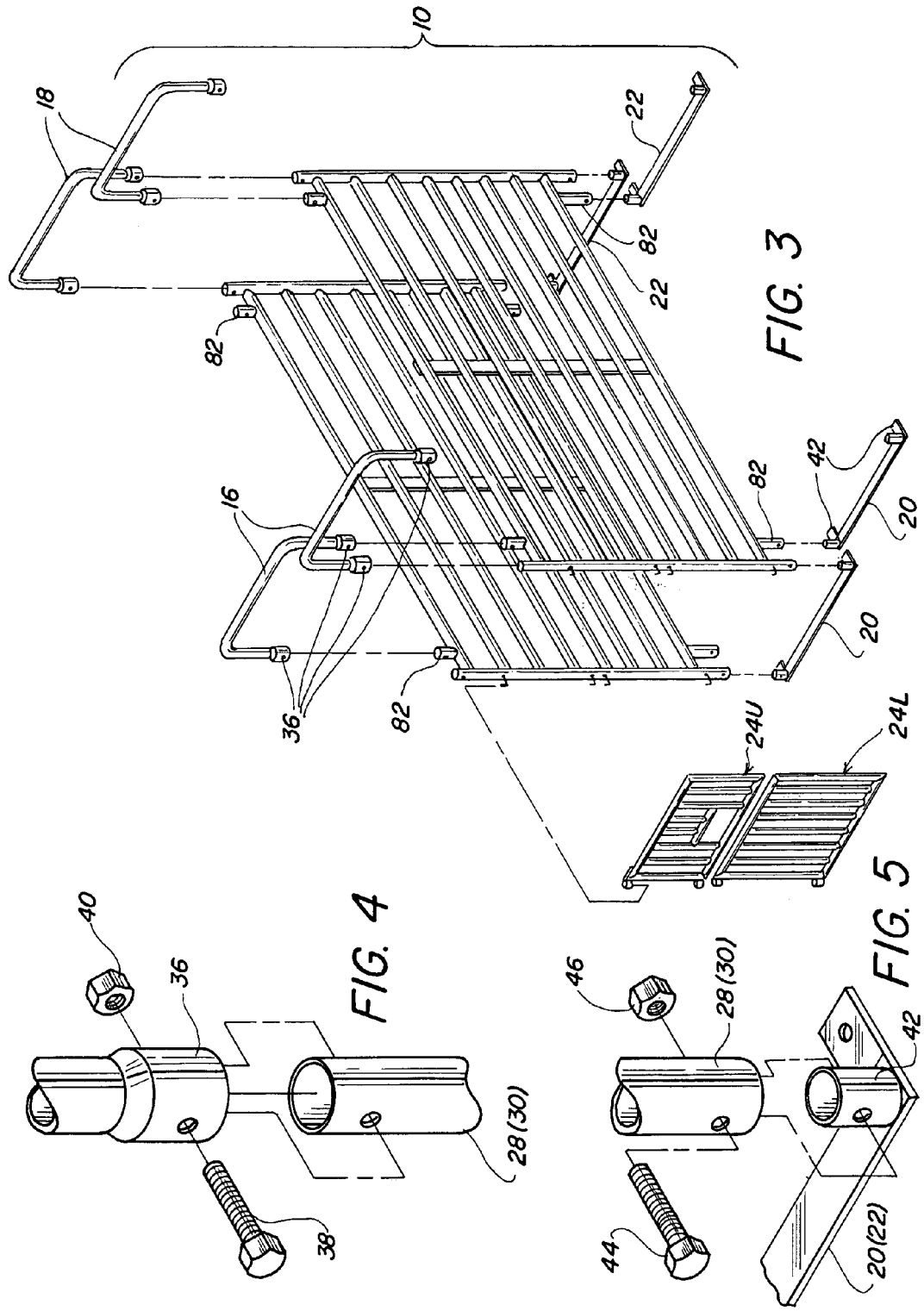

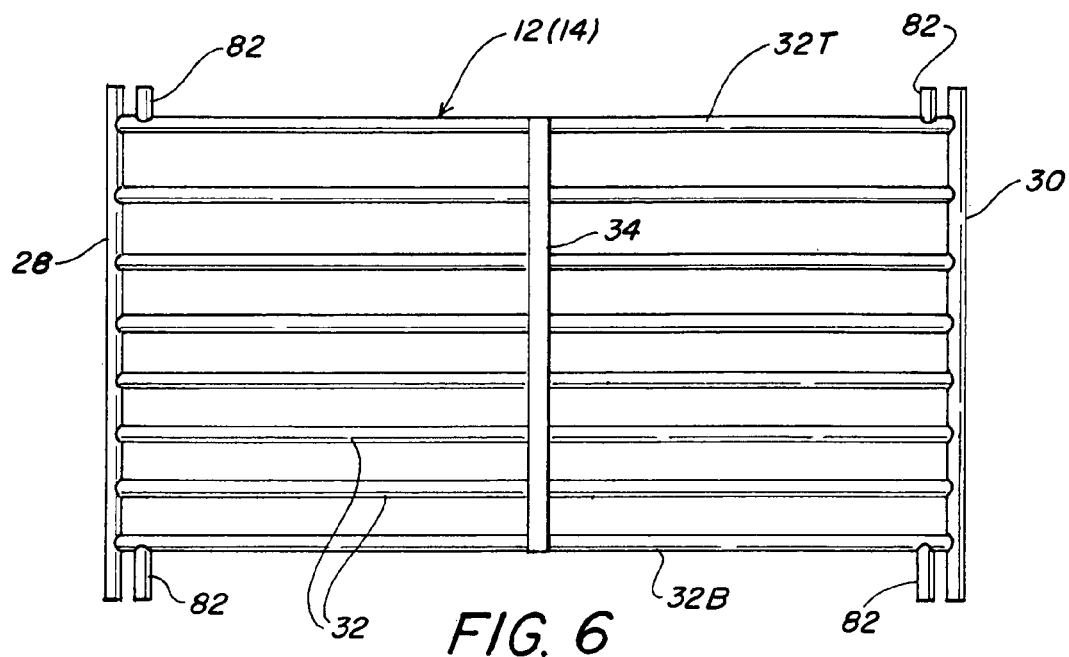
FIG. 6
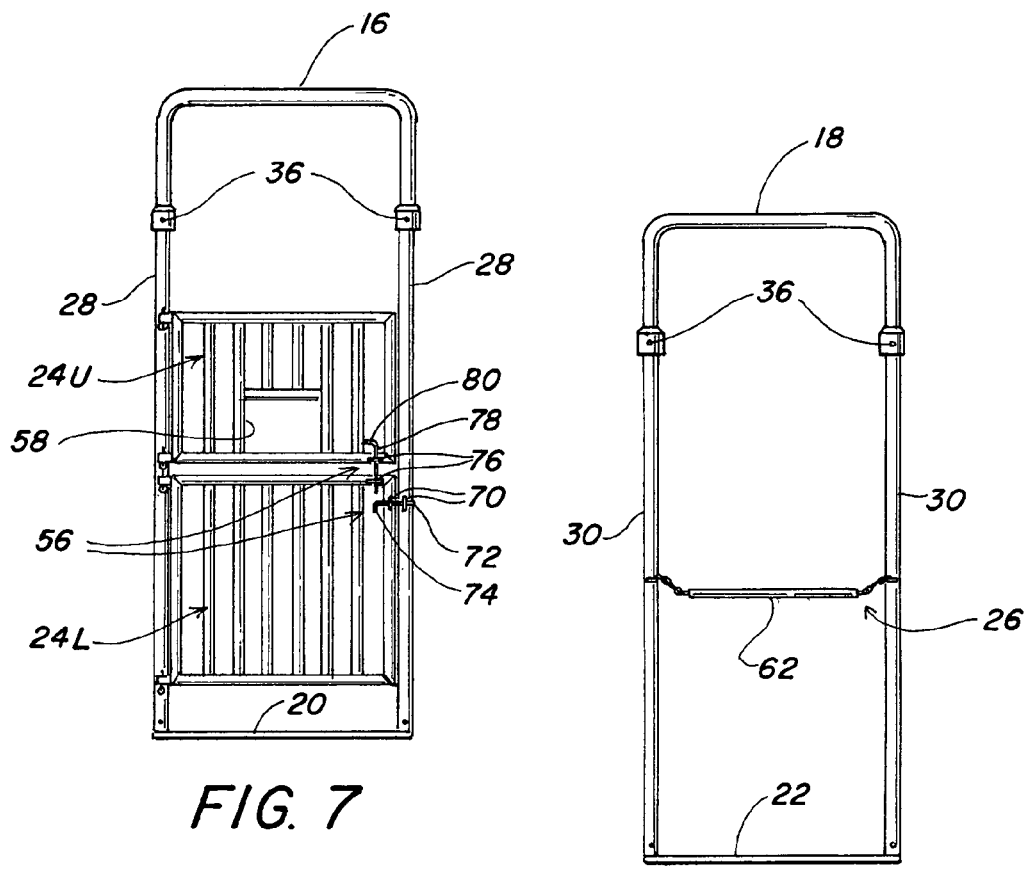
FIG. 7
FIG. 8

LIVESTOCK MANAGEMENT SYSTEM

BACKGROUND OF THE INVENTION

1. Field of the Invention

The present invention relates to a confinement and feeding stall for livestock such as horses, cows and the like that is wide enough so that an animal can stand comfortably but not turn around and narrow enough to prevent other animals from crowding into an occupied stall. The animal can freely enter without being herded and can freely back out. The front of each stall opens outwardly to allow the animal to be brought straight through the stall thus allowing easy access for further handling. When a plurality of stalls are linked together, the livestock will separate themselves into the individual stalls without being forced.

2. Brief Description of the Prior Art

It is sometimes desirable to feed different rations to different animals. With a herd this is difficult to accomplish without catching and separately penning them. What is needed is a passive system wherein the animals separate themselves into individual stalls such that different rations can be fed. The stall should permit the animals to freely enter and when done to freely back out. Other times, it is desirable to hold the livestock in separate stalls while individual animals are taken straight through for handling, grooming, riding, etc. Clearly the confinement and feeding experience must be pleasant for the animals to be voluntarily repeated and for it to remain a passive system.

No prior art stall provides a passive confinement and feeding system as discussed above. Some previously designed stalls catch or hold the livestock to immobilize them. Other systems require the livestock to be herded or driven into the apparatus. Some require that the animal be already restrained before it is led into the stall. Others are designed to handle only one animal at a time. Representative examples of such stalls are described in U.S. Pat. Nos. 6,205,951, 6,070,555, 6,026,766, 5,634,438, 5,392,731, 5,309,869, 5,289,798, 4,977,856, 4,470,372, 4,432,305, 4,201,158, 4,171,684, 2,659,344, 2,023,774 and 1,209,688.

BRIEF SUMMARY OF THE INVENTION

In view of the above, it is an object of the present invention to provide a confinement and feeding stall that makes feeding and/or catching horses or other livestock safe and efficient. It is another object to provide a confinement and feeding stall that permits animals to separate themselves into individual stalls. It is also an object to provide a confinement and feeding stall that protects the timid animals so that they are not bullied by the more dominant ones. Other objects and features of the invention will be in part apparent and in part pointed out hereinafter.

In accordance with the invention, a confinement and feeding stall for a horse has:

(a) First and second opposed side frames, each of said frames having a front post and a rear post interconnected by a plurality of spaced apart horizontal rails. The side frames are longer than the animal and the horizontal rails extend above its front shoulders so that it cannot reach over the top, the side frames or around the front end.

(b) First and second elevated top members, said first elevated top member extending transversely between and interconnecting the front posts and said second elevated top member extending transversely between and interconnecting the rear posts. The top members are sufficiently elevated that the animal will not bump its head if it rears.

(c) A coupling for mating the elevated top members with the posts. The coupling can be attached to the top members or the posts.

(d) First and second flat bottom members, said first flat bottom member extending transversely between and interconnecting the front posts and said second flat bottom member extending transversely between and interconnecting the rear posts. The flat bottom members space the side frames the same distance as the elevated members.

(e) A coupling for mating the flat bottom members with the posts. The coupling can be attached to the bottom members or the posts.

(f) A gate extending transversely between the front posts with the gate having opposing side edges and hingedly attached to one of said front posts along one of the side edges and latched to the other of said front posts along the other of the side edges. The gate opens outwardly so that an animal can be led through the stall and may include a window within which a feed bucket or the like may be hung.

(g) A rear closure member extending transversely between the rear posts may also be provided. This prevents the animal from backing out of the stall.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which:

FIG. 3 is an exploded perspective view of a confinement and feeding stall with added elevated top members and flat bottom members for linking an adjacent stall;

FIG. 4 is an exploded perspective detail showing a connection between the front or rear posts of the side frames with one of the elevated top members;

FIG. 5 is an exploded perspective detail showing a connection between the front or rear posts of the side frames with one of the flat bottom members;

FIG. 6 is a side elevation of one of the side frames;

FIG. 7 is a front elevation of the stall;

FIG. 8 is a rear view of the stall;

DETAILED DESCRIPTION OF THE INVENTION

Figure 1:
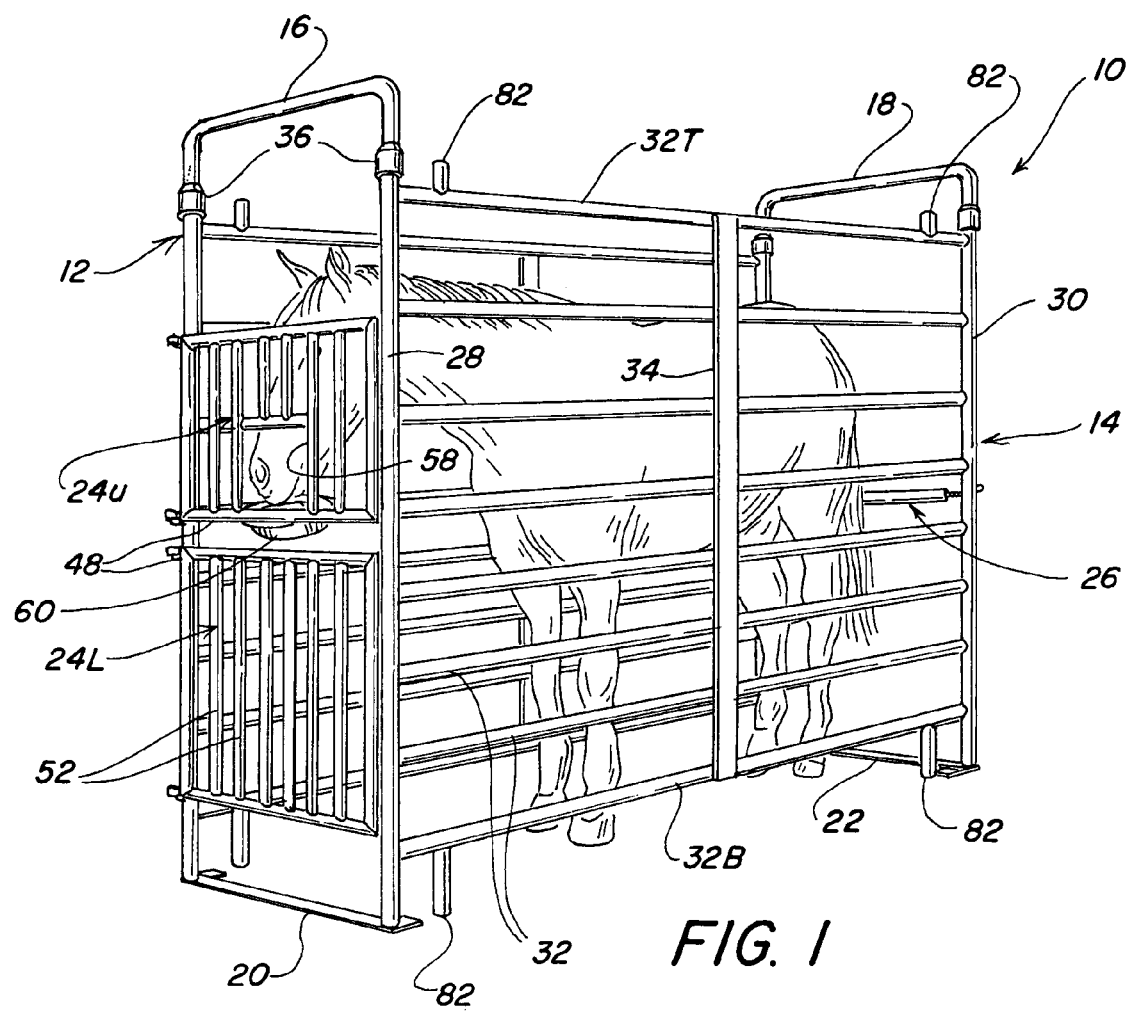
FIG. 1 is a perspective front view of a confinement and feeding stall in accordance with the present invention.

Referring to the drawings more particularly by reference character, reference numeral 10 refers to a confinement and feeding stall in accordance with the present invention. In major part, stall 10 includes a first and second opposed side frame 12, 14, a first and second elevated top member 16, 18, a first and second flat bottom member 20, 22, a gate 24 at the front and a rear closure 26.

Each of first and second side frames 12, 14 is formed from a front post 28 and a rear post 30 interconnected by a plurality of spaced apart horizontal rails 32. When stall 10 is for use with horses, it is preferred that the topmost rail 32T extend several hands above the shoulders of the horse and the bottommost rail 32B extend within about two hands of the supporting surface. Topmost and bottommost rails 32T, 32B at these levels prevent the horse from reaching over first and second side frames 12, 14 or getting its feet under the side frames. First and second side frames 12, 14 may be formed of steel pipe with rails 32 welded or otherwise affixed thereto. An intermediate upright member 34 may be welded or otherwise affixed to rails 32 midway the length thereof.

First and second elevated top members 16, 18 extend transversely between and interconnect front posts 28 and rear posts 30 of first and second side frames 12, 14 with a spacing slightly wider than the width of the animal using it. This will permit the animal to stand comfortably but not turn around and is narrow enough to prevent other animals from crowding into an occupied stall. In general, the animals in a herd of horses are subject to greater variation in length than in width. Thus stall 10 is preferably sized for the widest animal likely to be encountered because smaller animals in the group will be substantially confined laterally when they come into the stall.

First and second elevated top members 16, 18 have a coupling 36 at opposite ends for attachment to front and rear posts 28, 30, respectively. First and second elevated top members 16, 18 may be generally U-shaped and formed of steel pipe having the same diameter as front and rear posts 28, 30 with the pipe flared at the ends forming couplings 36. Couplings 36 are open ended for receipt of an upper end of front and rear posts 28, 30 for easy assembly of elevated top members 16, 18 on front and rear posts 28, 30. As shown in FIG. 4, a fastener such as a bolt 38 and a nut 40 may be passed through aligned holes in the upper end of front and rear posts 28, 30 and in couplings 36 to secure first and second elevated top members 16, 18 to front and rear posts 28, 30. It will be understood that other fasteners such as cotter pins may be used and that other couplings 36 may be welded or otherwise affixed to first and second elevated top members 16, 18. It will also be understood that the elements may be reversed with couplings 36 formed on the upper ends of front and rear posts 28, 30 for receipt of the ends of first and second elevated top members 16, 18.

First and second flat bottom members 20, 22 extend transversely between and interconnect front posts 28 and rear posts 30 with the same spacing between first and second side frames 12, 14 as established by elevated top members 16, 18. First and second bottom members 20, 22 are flat such that they do not trip the animal or catch a horse shoe. Each of first and second flat bottom members 20, 22 has a coupling 42 at opposite ends for mating with front and rear posts 28, 30. First and second flat bottom members 20, 22 may be made of steel bar stock with coupling 42 formed from a short length of steel pipe welded or otherwise affixed to flat bottom members 20, 22. Couplings 42 provide a nipple sized for receipt in the ends of front and rear posts 28, 30. As shown in FIG. 5, a fastener such as a bolt 44 and a nut 46 may be passed through aligned holes in the lower end of front and rear posts 28, 30 and in couplings 42 to secure first and second flat bottom members 20, 22 to front and rear posts 28, 30. It will be understood that the elements may be reversed with couplings 42 being larger than front and rear posts 28, 30 such that the couplings are received over the posts.

Gate 24 may be formed as a dutch door with upper and lower sections 24U, 24L that can be opened separately. Each of gate sections 24U, 24L is hinged such that it opens outwardly of stall 10 such that an animal can be lead through the stall for grooming, riding or other handling. Each of gate sections 24U, 24L is formed from horizontal and vertical members 48, 50, respectively interconnected to form a frame with a plurality of spaced apart uprights 52 completing the panel. Each of gate sections 24U, 24L is hingedly attached along one of vertical members 50 to one of front posts 28 and selectively latched to the other of front posts 28. Preferably both of gate sections 24U, 24L are hinged and latched to the same front post so that the sections open from the same side. Various hinge 54 and latch members 56 may be employed, representative ones of which are shown in the drawings.

A window 58 may be formed in upper section 24U through which a feed bucket 60 or the like may be hung. With upper and lower sections 24U, 24L closed, an animal in one stall cannot reach around front posts 28 into the feed bucket 60 or to otherwise disturb adjoining animals.

Closure member 26 may take the form of a gate or may simply be a chain. When closure member 26 is a chain, the chain may be sheathed with a piece of tubing 62.

Figure 10:
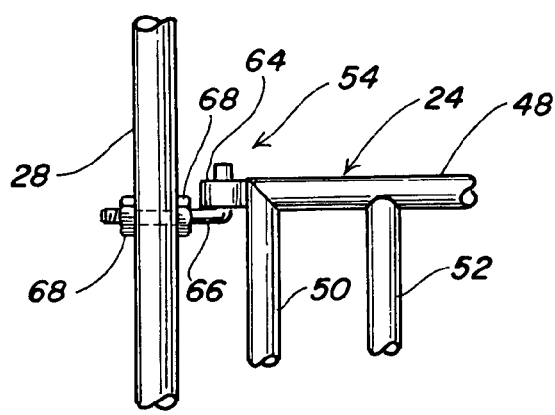
FIG. 10 is a detail in front elevation showing a hinge for connecting a gate to one of the front posts; and, FIG. 11 is a detail showing a plan view of the hinge shown in FIG. 10.
Figure 11:
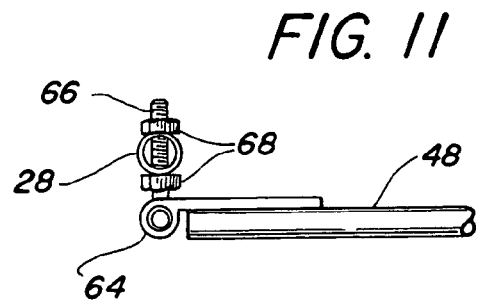

As shown in FIGS. 10 and 11 hinge 54 may formed with a pair and spaced apart ring collars 64 welded or otherwise affixed to vertical member 50 pivotably received on an L-shaped bolt 66 passed through aligned holes in front post 28. L-shaped bolt 66 is secured with nuts 68. Other suitable hinges 54 will occur to those skilled in the art.

Latches 56 for securing gate 24 to the other of front posts 28 are best seen in FIG. 7. Lower latch 56 is formed with a pair of loops 70, one of which is welded or otherwise affixed to front post 28 and the other of which is welded or otherwise affixed to vertical member 50. An elongated rod 72 with a bent portion forming a handle 74 is received in loops 70. As will be apparent from FIG. 7, elongate rod 72 locks gate 24 shut. When gate 24 is formed with upper and lower sections 24U, 24L, a second pair of loops 76 is welded or otherwise affixed to a lower one of horizontal members 48 on upper section 24U and an upper one of horizontal members 48 on lower section 24L. An elongated rod 78 with a bent portion forming a handle 80 is received in loops 76 for locking upper section 24U to lower section 24L such that they may be opened and closed as a unit.

Figure 2:
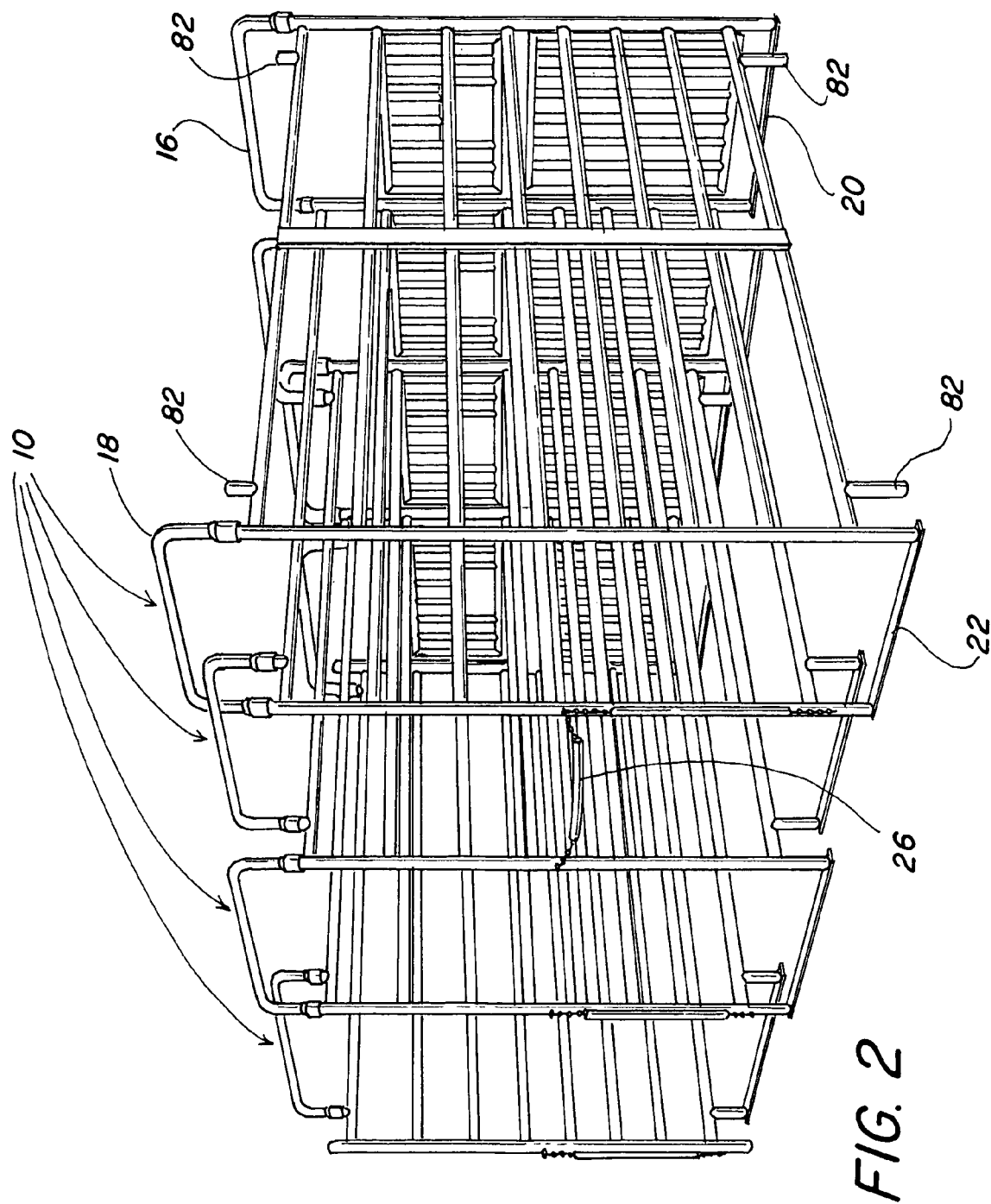
FIG. 2 is a perspective rear view of a plurality of confinement and feeding stalls linked together.
Figure 9:
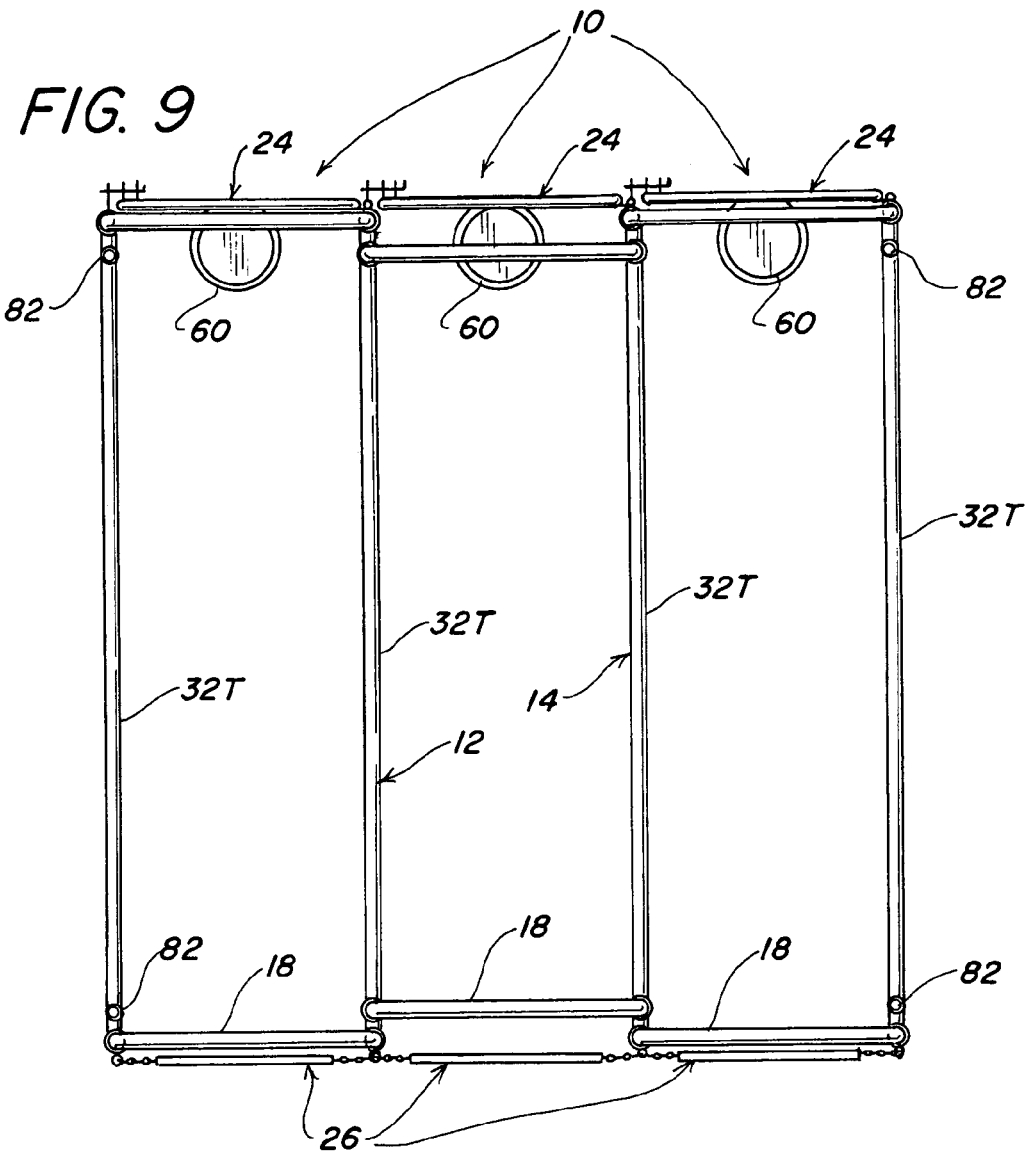
FIG. 9 is plan view of three stalls linked together.

When a plurality of stalls 10 are to be linked side-by-side with one of side frames 12, 14 forming a common wall between the stalls as shown in FIGS. 2 and 9, a short length of pipe 82 is welded or otherwise affixed inboard of front and rear posts 28, 30 on topmost and bottommost rails 32T, 32B. Pipes 82 may have the same outside and inside diameter as front and rear posts 28, 20 and are parallel therewith such that identical couplings 36, 42 may be used to attach elevated top members 16, 18 and flat bottom members 20, 22 associated with an adjacent stall 12 to side frames 12, 14.

Optimum dimensions for stall 10 include the following, which are not limiting. Two-inch outer diameter steel pipe is employed for side frames 12, 14, elevated top members 16, 18 and gate 24. Flat bottom members 20, 22 may be made of one-half inch thick flat steel, two inches wide. Side frames 12, 14 are 10 feet long and six feet, two inches high. Bottommost rail 32B is seven inches off the supporting surface and topmost rail 32T is four inches from the top of front and rear posts 28, 30. The length of elevated top members 16, 18 and flat bottom members 20, 22 is such that the spacing between side frames 12, 14 is 32 inches. When elevated top members 16, 18 are U-shaped, the bottom of the U is 7 feet seven and one-half inches above the supporting surface. The top of gate 24 is 57 inches above the supporting surface and the bottom six inches above the supporting surface.

Use and Operation

Stalls 10 provide a very safe and efficient method for feeding and/or catching horses or other livestock that are grazing in an open area. One or more stalls 10 as shown in FIG. 1 or 2 may be assembled with the entrance of the stalls facing a lot, pasture or field where the livestock spends most of their time grazing. The stalls may also be installed in a barn and bolted to the floor, holes for which may be provided in flat bottom members 20, 22. Stalls 10 are also portable. When the grass has been consumed one area, stalls 10 can be easily disassembled and moved into another field, paddock, barn or anywhere the user desires.

At feeding time, the animals will come to stalls 10 with one animal entering each stall. Feed may then be placed in feed buckets 60 in each stall with each animal being fed a different ration if desired. When the animals finish eating, they back out of their stall and go grazing or whatever they desire.

The stalls 10 are designed such that an animal cannot reach over or around the stall to disturb adjoining animals in adjacent stalls. The stalls are narrow enough that a second animal cannot enter so that even a timid animal can defend his or her feed bucket from an interloper approaching from the rear. This permits the stockman to feed different types or amounts of rations to different animals and then immediately leave the herd unattended. Each animal is protected from the others so they are not bullied out by the more dominant ones, without having to separately pen each one.

If it is desired to confine one or more of the animals, rear closure members 26 may be employed after the animals have entered stalls 10 for feeding. While the animals are locked in, selected gates 24 can be opened and the animals brought straight through the stall. This may be desirable, for example, when one or more of the horses are to be ridden in the grazing area. During this time, the others should be confined as it is dangerous to ride a horse in the presence of other horses that are free. When confinement is no longer needed, rear closure members 26 can be opened and the livestock is free to back out.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A confinement for horses comprising at least three feeding stalls linked side-by-side, each stall having
   first and second opposed side frames, each of said frames having a front post and a rear post interconnected by a plurality of spaced apart horizontal rails;
   alternating stalls having first and second elevated top members, said first elevated top member extending transversely between and interconnecting the front posts and said second elevated top member extending transversely between and interconnecting the rear posts,
   a coupling for mating the elevated top members with the posts;
   said alternating stalls having first and second flat bottom members, said first flat bottom member extending transversely between and interconnecting the front posts and said second flat bottom member extending transversely between and interconnecting the rear posts,
   a coupling for mating the flat bottom members with the posts; and,
   a gate extending transversely between the front posts, said gate having opposing side edges and hingedly attached to one of said front posts along one of the side edges and latched to the other of said front posts along the other of the side edges
   one of said opposed side frames forming a common wall between adjacent stalls,
   each of said side frames having at least two short lengths of pipe affixed inboard of each post to a topmost of the horizontal rails, additional alternating stalls having third and fourth elevated top members extending transversely between and interconnecting at least two of the at least two short lengths of pipe to at least two short lengths of pipe disposed on opposing side frames respectively; at least two short lengths of pipe affixed inboard of each post on the bottommost of said horizontal rails, said additional alternating stalls having third and fourth flat bottom members extending transversely between and interconnecting at least two of the at least two short lengths of pipe to at least two short lengths of pipe disposed on opposing side frames respectively; and
   said at least two short lengths of pipe affixed to the topmost of the horizontal rails being a length such that said at least two short lengths of pipe extends above the topmost of the horizontal rails the same distance as the front and rear posts and said at least two short lengths of pipe affixed to the bottommost of the horizontal rails being a length such that said at least two short lengths of pipe extends below the bottommost of the horizontal rails the same distance as the front and rear posts.

2. The confinement of claim 1 wherein the front and rear posts, horizontal rails and elevated top members are formed of pipe.

3. The confinement of claim 2 wherein the first and second ends of the elevated top members are flared and form the couplings for mating to the posts.

4. The confinement of claim 2 wherein the couplings on the flat bottom members are sections of pipe having a reduced diameter for receipt into an open end of the posts.

5. The confinement of claim 2 further comprising a rear closure extending transversely between the rear posts.

6. A confinement for horses comprising at least three feeding stalls linked side-by-side, each stall having
   a pair of opposed side frames, each of said frames having a front post and a rear post interconnected by a plurality of spaced apart horizontal rails;
   alternating stalls having a first pair of elevated top members extending transversely between and interconnecting the front posts and the rear posts, each of said elevated top members having a coupling at opposite ends for mating with the posts;
   said alternating stalls having a first pair of flat bottom members extending transversely between and interconnecting the front posts and the rear posts, each of said flat bottom members having a coupling at opposite ends for mating with the posts;
   first and second independent gates, said first gate positioned above the second gate, each of said gates extending transversely between the front posts, each of said gates having opposing side edges, said gates hingedly attached to one of said front posts along one of the side edges and selectively latched to the other of said front posts along the other of the side edges; and, a closure member extending transversely between the rear posts one of said opposed side frames forming a common wall between adjacent stalls, each of said side frames having at least two short lengths of pipe affixed inboard of each post to a topmost of the horizontal rails, additional alternating stalls having a second pair of elevated top members extending transversely between and interconnecting at least two of the at least two short lengths of pipe to at least two short lengths of pipe disposed on opposing side frames respectively; at least two short lengths of pipe affixed inboard of each post on the bottommost of said horizontal rails, said additional alternating stalls having a second pair of flat bottom members extending transversely between and interconnecting at least two of the at least two short lengths of pipe to at least two short lengths of pipe disposed on opposing side frames respectively; and said at least two short lengths of pipe affixed to the topmost of the horizontal rails being a length such that said at least two short lengths of pipe extends above the topmost of the horizontal rails the same distance as the front and rear posts and said at least two short lengths of pipe affixed to the bottommost of the horizontal rails being a length such that said at least two short lengths of pipe extends below the bottommost of the horizontal rails the same distance as the front and rear posts.

7. The confinement of claim 6 wherein a window is provided in the first gate within which a feed bucket is hung.

8. The confinement of claim 6 wherein the front and rear posts, horizontal rails and elevated top members are formed of pipe.

9. The confinement of claim 8 wherein first and second ends of the elevated top members are flared and form the couplings for mating to the posts.

10. The confinement of claim 8 wherein the couplings on the flat bottom members are sections of pipe having a reduced diameter for receipt into an open end of the posts.

* * * * *